United States Patent
Iwata et al.

(10) Patent No.: US 12,163,706 B2
(45) Date of Patent: Dec. 10, 2024

(54) REFRIGERATION APPARATUS

(71) Applicant: DAIKIN INDUSTRIES, LTD., Osaka (JP)

(72) Inventors: Ikuhiro Iwata, Osaka (JP); Eiji Kumakura, Osaka (JP); Takuro Yamada, Osaka (JP); Ryuhei Kaji, Osaka (JP); Tomoki Hirokawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 319 days.

(21) Appl. No.: 17/705,777

(22) Filed: Mar. 28, 2022

(65) Prior Publication Data
US 2022/0214089 A1 Jul. 7, 2022

Related U.S. Application Data

(63) Continuation of application No. PCT/JP2020/036922, filed on Sep. 29, 2020.

(30) Foreign Application Priority Data

Sep. 30, 2019 (JP) .................. 2019-180814

(51) Int. Cl.
*F25B 13/00* (2006.01)
*F25B 39/02* (2006.01)
(Continued)

(52) U.S. Cl.
CPC .............. *F25B 41/20* (2021.01); *F25B 13/00* (2013.01); *F25B 39/02* (2013.01); *F25B 49/02* (2013.01)

(58) Field of Classification Search
CPC .......... F25B 41/20; F25B 13/00; F25B 39/02; F25B 49/02
See application file for complete search history.

(56) References Cited

U.S. PATENT DOCUMENTS

2013/0260251 A1 10/2013 Shiroki et al.

FOREIGN PATENT DOCUMENTS

| EP | 2801770 A1 | 11/2014 |
| GB | 2525791 A | 11/2015 |

(Continued)

OTHER PUBLICATIONS

English translation of International Search Report issued in corresponding International Application No. PCT/JP2020/036922, mailed on Dec. 8, 2020 (4 pages).
(Continued)

*Primary Examiner* — Nael N Babaa
(74) *Attorney, Agent, or Firm* — Osha Bergman Watanabe & Burton LLP (57) ABSTRACT

A refrigeration apparatus includes: a compressor; an outdoor heat exchanger connected to the compressor; an indoor heat exchanger connected to the compressor; and an expansion valve disposed between the outdoor heat exchanger and the indoor heat exchanger. In cooling operation, a refrigerant flows through the compressor, the outdoor heat exchanger, the expansion valve, and the indoor heat exchanger in this order. In heating operation, the refrigerant flows through the compressor, the indoor heat exchanger, the expansion valve, and the outdoor heat exchanger in this order. The refrigerant is an HFO (hydrofluoroolefin) refrigerant or a refrigerant mixture that includes an HFO refrigerant. The indoor heat exchanger and the outdoor heat exchanger are cross-fin-type heat exchangers or stack-type heat exchangers.

11 Claims, 7 Drawing Sheets

(51) Int. Cl.
*F25B 41/20* (2021.01)
*F25B 49/02* (2006.01)

(56) References Cited

FOREIGN PATENT DOCUMENTS

| JP | 2012077983 A | 4/2012 |
| WO | 2014118953 A1 | 8/2014 |
| WO | 2016110974 A1 | 7/2016 |

OTHER PUBLICATIONS

Extended European Search Report issued in European Application No. 20873117.4, dated Oct. 14, 2022 (7 pages).
International Preliminary Report on Patentability issued in corresponding International Application No. PCT/JP2020/036922 dated Apr. 5, 2022 (7 pages).

| NUMBER OF ROWS OF OUTDOOR HEAT EXCHANGER | TYPE | INDOOR HEAT EXCHANGER | OUTDOOR HEAT EXCHANGER |
|---|---|---|---|
| ONE ROW | A 1 | CROSS-FIN TYPE | CROSS-FIN TYPE |
| | | STACK TYPE | STACK TYPE |
| | B 1 | CROSS-FIN TYPE | STACK TYPE |
| | C 1 | STACK TYPE | CROSS-FIN TYPE |
| TWO ROW | A 2 | CROSS-FIN TYPE | CROSS-FIN TYPE |
| | | STACK TYPE | STACK TYPE |
| | B 2 | CROSS-FIN TYPE | STACK TYPE |
| | C 2 | STACK TYPE | CROSS-FIN TYPE |

FIG. 4

| | REFRIGERANT | LIQUID-GAS AVERAGE DENSITY $\rho$ [kg/m³] | $\rho$ R32/ $\rho$ HFO | UPPER LIMIT [%] OF VOLUME RATIO S | | |
|---|---|---|---|---|---|---|
| | | | | TYPE A1 | TYPE B1 | TYPE C1 |
| HFC BASED | R32 | 476.1 | — | — | — | — |
| HFO BASED | R1132(E), R1123, R1234yf REFRIGERANT MIXTURE A | 490.7 | 0.97 | 291 | 175 | 485 |
| | R1132(E), R1123, R1234yf REFRIGERANT MIXTURE B | 511.0 | 0.93 | 279 | 168 | 466 |
| | R1123 | 529.0 | 0.90 | 270 | 162 | 450 |
| | R1124yf | 539.4 | 0.88 | 265 | 159 | 442 |
| | R1123ze | 569.9 | 0.84 | 251 | 150 | 418 |

| | REFRIGERANT | LIQUID-GAS AVERAGE DENSITY $\rho$ [kg/m$^3$] | $\rho$ R32/ $\rho$ HFO | UPPER LIMIT [%] OF VOLUME RATIO S | | |
|---|---|---|---|---|---|---|
| | | | | TYPE A2 | TYPE B2 | TYPE C2 |
| HFC BASED | R32 | 476.1 | — | — | — | — |
| HFO BASED | R1132(E) R1123 R1234yf } REFRIGERANT MIXTURE A | 490.7 | 0.97 | 388 | 232 | 646 |
| | R1132(E) R1123 R1234yf } REFRIGERANT MIXTURE B | 511.0 | 0.93 | 373 | 224 | 621 |
| | R1123 | 529.0 | 0.90 | 360 | 216 | 600 |
| | R1124yf | 539.4 | 0.88 | 353 | 212 | 589 |
| | R1123ze | 569.9 | 0.84 | 334 | 200 | 557 |

REFRIGERATION APPARATUS

CROSS-REFERENCE TO RELATED APPLICATIONS

The present application is a continuation of International Application No. PCT/JP2020/036922, filed Sep. 29, 2020, which claims priority to Japanese Patent Application No. 2019-180814, filed Sep. 30, 2019. The contents of these applications are incorporated herein by reference in their entirety.

TECHNICAL FIELD

The present disclosure relates to a refrigeration apparatus that uses an HFO (hydrofluoroolefin) refrigerant or a refrigerant mixture including an HFO refrigerant.

BACKGROUND

As described in, for example, Background Art in PTL 1 (Japanese Unexamined Patent Application Publication No. 2012-077983), the volume of an outdoor heat exchanger is generally set to be larger than the volume of an indoor heat exchanger in an air conditioner in which one indoor unit is operated by one outdoor unit. The larger the volume difference between the outdoor heat exchanger and the indoor heat exchanger, the more the refrigerant insufficiency or the refrigerant excess occurs in cooling operation and heating operation and the COP decreases. Since the volume of the outdoor heat exchanger is larger than the volume of the indoor heat exchanger in the aforementioned air conditioner, a refrigerant becomes slightly excessive in heating operation when the amount of the refrigerant in the system is suitably regulated in cooling operation. Meanwhile, when the amount of the refrigerant is suitably regulated during heating operation, the refrigerant becomes insufficient during cooling operation.

SUMMARY

A refrigeration apparatus according to one or more embodiments is a refrigeration apparatus in which a refrigerant flows during cooling operation in a compressor, an outdoor heat exchanger, an expansion mechanism, and an indoor heat exchanger sequentially and in which the refrigerant flows during heating operation in the compressor, the indoor heat exchanger, the expansion mechanism, and the outdoor heat exchanger sequentially. The refrigerant is an HFO (hydrofluoroolefin) refrigerant or a refrigerant mixture that includes an HFO refrigerant. Both of the indoor heat exchanger and the outdoor heat exchanger are cross-fin-type heat exchangers or stack-type heat exchangers. When the outdoor heat exchanger has a one-row configuration, a volume ratio S [Vo] of the outdoor heat exchanger to the indoor heat exchanger satisfies a relational expression of $$100 \leq S \leq 1.0112E-03 \times \rho^2 - 1.5836E+00 \times \rho + 8.2472E+02$$

where $\rho$ [kg/m^3]: an average density of a saturated liquid gas at a condensation temperature of 45° C.

DETAILED DESCRIPTION

First Embodiments (1) Configuration of Air Conditioning Apparatus 1

Figure 1:
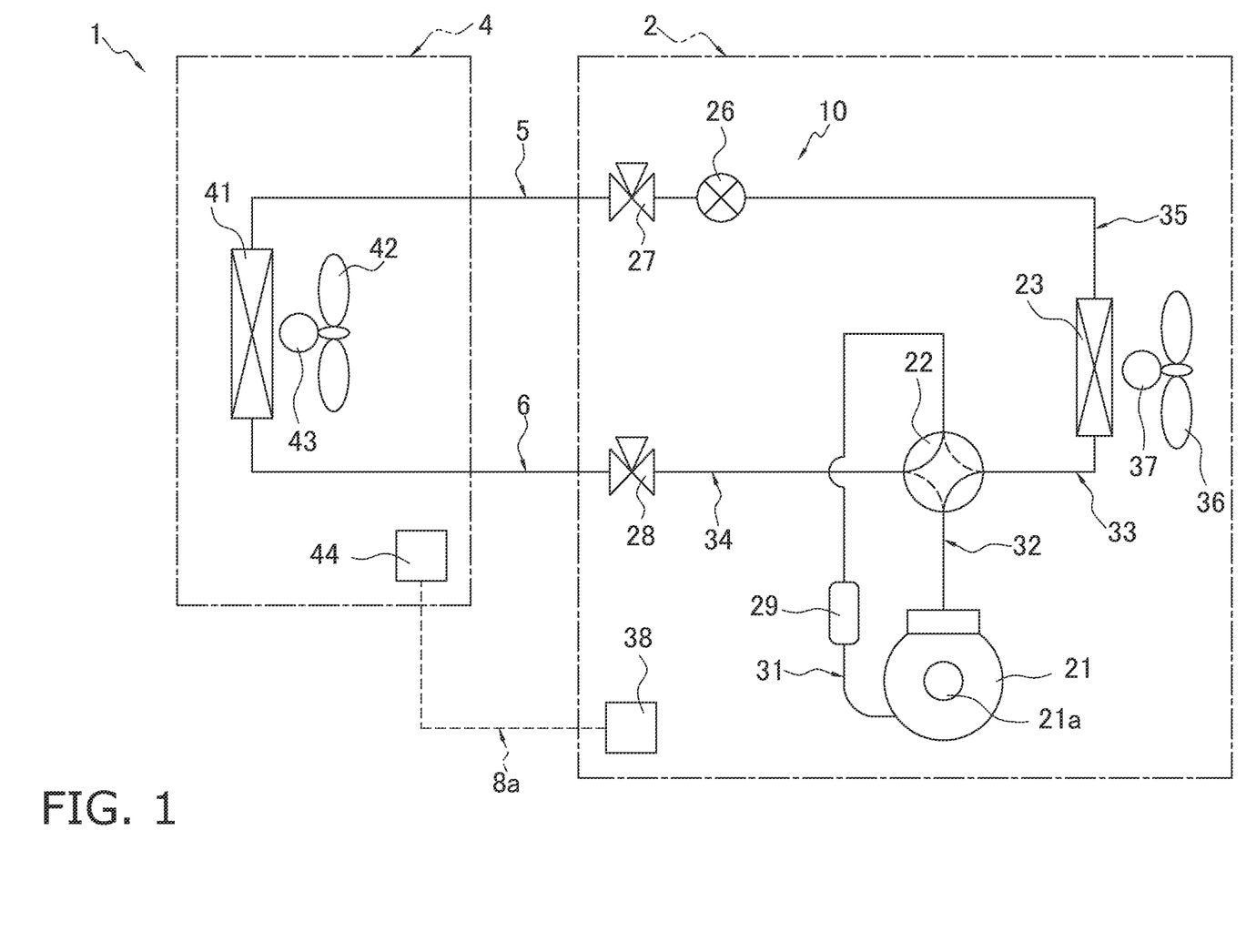
FIG. 1 is a schematic diagram of an air conditioning apparatus as a refrigeration apparatus according to one or more embodiments of the present disclosure.

FIG. 1 is a schematic diagram of an air conditioning apparatus 1 according to one or more embodiments of the present disclosure. In FIG. 1, the air conditioning apparatus 1 is a refrigeration apparatus that performs cooling operation and heating operation by a vapor compression refrigeration cycle.

A refrigerant circuit 10 of the air conditioning apparatus 1 is constituted by an outdoor unit 2 and an indoor unit 4 that are connected to each other via a liquid-refrigerant connection pipe 5 and a gas-refrigerant connection pipe 6.

A refrigerant enclosed in the refrigerant circuit 10 is an HFO (hydrofluoroolefin) refrigerant or a refrigerant mixture that includes an HFO refrigerant. An HFO refrigerant is any of R1132(E), R1123, R1234yf, and R1234ze.

(1-1) Indoor Unit 4

The indoor unit 4 is installed indoors and constitutes part of the refrigerant circuit 10. The indoor unit 4 includes an indoor heat exchanger 41, an indoor fan 42, and an indoor-side control unit 44.

(1-1-1) Indoor Heat Exchanger 41

The indoor heat exchanger 41 functions as an evaporator for the refrigerant during cooling operation and cools indoor air. The indoor heat exchanger 41 functions as a radiator for the refrigerant during heating operation and heats indoor air. The refrigerant inlet side of the indoor heat exchanger 41 during cooling operation is connected to the liquid-refrigerant connection pipe 5, and the refrigerant outlet side thereof is connected to the gas-refrigerant connection pipe 6.

As the indoor heat exchanger 41, a cross-fin-type heat exchanger or a stack-type heat exchanger is employed. The cross-fin-type heat exchanger and the stack-type heat exchanger will be described in "(3) Selection of Indoor Heat Exchanger 41 and Outdoor Heat Exchanger 23".

(1-1-2) Indoor Fan 42

The indoor fan 42 takes indoor air into the indoor unit 4, causes the indoor air to exchange heat with the refrigerant in the indoor heat exchanger 41, and then supplies the air to the inside of a room. As the indoor fan 42, a centrifugal fan, a multi-blade fan, or the like is employed. The indoor fan 42 is driven by an indoor fan motor 43.

(1-1-3) Indoor-Side Control Unit 44

The indoor-side control unit 44 controls operation of each portion that constitutes the indoor unit 4. The indoor-side control unit 44 has a microcomputer and a memory that are for controlling the indoor unit 4.

The indoor-side control unit 44 transmits and receives a control signal and the like to and from a remote controller (not illustrated). In addition, the indoor-side control unit 44 transmits and receives a control signal and the like to and from an outdoor-side control unit 38 of the outdoor unit 2 via a transmission line 8a.

(1-2) Outdoor Unit 2

The outdoor unit 2 is installed outdoors and constitutes part of the refrigerant circuit 10. The outdoor unit 2 includes a compressor 21, a four-way switching valve 22, an outdoor heat exchanger 23, an expansion valve 26, a liquid-side shutoff valve 27, and a gas-side shutoff valve 28.

(1-2-1) Compressor 21

The compressor 21 is a device that compresses a low-pressure refrigerant of the refrigeration cycle. The compressor 21 drives and rotates a positive-displacement compression element (not illustrated) of a rotary type, a scroll type, or the like by a compression motor 21a.

A suction pipe 31 is connected to the suction side of the compressor 21, and a discharge pipe 32 is connected to the discharge side thereof. The suction pipe 31 is a refrigerant pipe that connects the suction side of the compressor 21 and the four-way switching valve 22 to each other. The discharge pipe 32 is a refrigerant pipe that connects the discharge side of the compressor 21 and the four-way switching valve 22 to each other.

An accumulator 29 is connected to the suction pipe 31. The accumulator 29 separates a flowed-in refrigerant into a liquid refrigerant and a gas refrigerant and causes only the gas refrigerant to flow to the suction side of the compressor 21.

(1-2-2) Four-Way Switching Valve 22

The four-way switching valve 22 switches the direction of the flow of the refrigerant in the refrigerant circuit 10. During cooling operation, the four-way switching valve 22 causes the outdoor heat exchanger 23 to function as a radiator for the refrigerant and causes the indoor heat exchanger 41 to function as an evaporator for the refrigerant.

During cooling operation, the four-way switching valve 22 connects the discharge pipe 32 of the compressor 21 and a first gas refrigerant pipe 33 of the outdoor heat exchanger 23 to each other (refer to the solid lines of the four-way switching valve 22 in FIG. 1) and connects the suction pipe 31 of the compressor 21 and a second gas refrigerant pipe 34 to each other (refer to the solid lines of the four-way switching valve 22 in FIG. 1).

During heating operation, the four-way switching valve 22 is switched to a heating cycle state in which the outdoor heat exchanger 23 functions as an evaporator for the refrigerant and in which the indoor heat exchanger 41 functions as a radiator for the refrigerant.

During heating operation, the four-way switching valve 22 connects the discharge pipe 32 of the compressor 21 and the second gas refrigerant pipe 34 to each other (refer to the broken lines of the four-way switching valve 22 in FIG. 1) and connects the suction pipe 31 of the compressor 21 and the first gas refrigerant pipe 33 of the outdoor heat exchanger 23 to each other (refer to the broken lines of the four-way switching valve 22 in FIG. 1).

Here, the first gas refrigerant pipe 33 is a refrigerant pipe that connects the four-way switching valve 22 and the refrigerant inlet of the outdoor heat exchanger 23 during cooling operation to each other. The second gas refrigerant pipe 34 is a refrigerant pipe that connects the four-way switching valve 22 and the gas-side shutoff valve 28 to each other.

(1-2-3) Outdoor Heat Exchanger 23

The outdoor heat exchanger 23 functions as a radiator for the refrigerant during cooling operation. In addition, the outdoor heat exchanger 23 functions as an evaporator for the refrigerant during heating operation. One end of a liquid refrigerant pipe 35 is connected to the refrigerant outlet of the outdoor heat exchanger 23 during cooling operation. The other end of the liquid refrigerant pipe 35 is connected to the expansion valve 26.

As the outdoor heat exchanger 23, a cross-fin-type heat exchanger or a stack-type heat exchanger is employed. The cross-fin-type heat exchanger and the stack-type heat exchanger will be described in "(3) Selection of Indoor Heat Exchanger 41 and Outdoor Heat Exchanger 23".

(1-2-4) Expansion Valve 26

The expansion valve 26 is an electric expansion valve. During cooling operation, the expansion valve 26 decompresses a high-pressure refrigerant that is sent from the outdoor heat exchanger 23 to a low pressure. During heating operation, the expansion valve 26 decompresses a high-pressure refrigerant that is sent from the indoor heat exchanger 41 to a low pressure.

(1-2-5) Liquid-Side Shutoff Valve 27 and Gas-Side Shutoff Valve 28

The liquid-side shutoff valve 27 is connected to the liquid-refrigerant connection pipe 5. The gas-side shutoff valve 28 is connected the gas-refrigerant connection pipe 6. The liquid-side shutoff valve 27 is positioned downstream the expansion valve 26 in a refrigerant circulation direction during cooling operation. The gas-side shutoff valve 28 is positioned upstream the four-way switching valve 22 in a refrigerant circulation direction during cooling operation.

(1-2-6) Outdoor Fan 36

The outdoor unit 2 includes an outdoor fan 36. The outdoor fan 36 takes outdoor air into the outdoor unit 2, causes the outdoor air to exchange heat with the refrigerant in the outdoor heat exchanger 23, and then discharges the air to the outside. As the outdoor fan 36, a propeller fan or the like is employed. The outdoor fan 36 is driven by an outdoor-fan motor 37.

(1-2-7) Outdoor-Side Control Unit 38

The outdoor-side control unit 38 controls operation of each portion that constitutes the outdoor unit 2. The outdoor-side control unit 38 has a microcomputer and a memory that are for controlling the outdoor unit 2.

The outdoor-side control unit 38 transmits and receives a control signal and the like to and from the indoor-side control unit 44 of the indoor unit 4 via the transmission line 8a.

(1-3) Connection Pipes 5 and 6

The connection pipes 5 and 6 are refrigerant pipes that are constructed locally during installation of the air conditioning apparatus 1 in an installation location at a building or the like. As each of the connection pipes 5 and 6, a pipe having an appropriate length and an appropriate diameter is employed in accordance with installation conditions such as an installation location, a combination of the outdoor unit 2 and the indoor unit 4, and the like.

(2) Basic Operation of Air Conditioning Apparatus 1

Next, a basic operation of the air conditioning apparatus 1 will be described with reference to FIG. 1. The air conditioning apparatus 1 is capable of performing cooling operation and heating operation as basic operation.

(2-1) Cooling Operation

During cooling operation, the four-way switching valve 22 is switched to a cooling cycle state (the state indicated by the solid lines in FIG. 1). In the refrigerant circuit 10, a low-pressure gas refrigerant of the refrigeration cycle is sucked by the compressor 21 and discharged after compressed.

The high-pressure gas refrigerant discharged from the compressor 21 is sent to the outdoor heat exchanger 23 via the four-way switching valve 22.

In the outdoor heat exchanger 23 that functions as a radiator, the high-pressure gas refrigerant sent to the outdoor heat exchanger 23 radiates heat by exchanging heat with outdoor air supplied from the outdoor fan 36, and becomes a high-pressure liquid refrigerant. The high-pressure liquid refrigerant is sent to the expansion valve 26.

The high-pressure liquid refrigerant sent to the expansion valve 26 is decompressed to a low pressure of the refrigeration cycle by the expansion valve 26 and becomes a low-pressure gas-liquid two-phase refrigerant. The low-pressure gas-liquid two-phase refrigerant decompressed in the expansion valve 26 is sent to the indoor heat exchanger 41 via the liquid-side shutoff valve 27 and the liquid-refrigerant connection pipe 5.

The low-pressure gas-liquid two-phase refrigerant sent to the indoor heat exchanger 41 evaporates in the indoor heat exchanger 41 by exchanging heat with indoor air supplied from the indoor fan 42. Consequently, the indoor air is cooled. Then, the cooled air is supplied to the inside of a room, thereby cooling the inside of the room.

The low-pressure gas refrigerant that has evaporated in the indoor heat exchanger 41 is sucked again by the compressor 21 via the gas-refrigerant connection pipe 6, the gas-side shutoff valve 28, and the four-way switching valve 22.

(2-2) Heating Operation

During heating operation, the four-way switching valve 22 is switched to the heating cycle state (the state indicated by the broken lines in FIG. 1). In the refrigerant circuit 10, a low-pressure gas refrigerant of the refrigeration cycle is sucked by the compressor 21 and discharged after compressed.

The high-pressure gas refrigerant discharged from the compressor 21 is sent to the indoor heat exchanger 41 via the four-way switching valve 22, the gas-side shutoff valve 28, and the gas-refrigerant connection pipe 6.

The high-pressure gas refrigerant sent to the indoor heat exchanger 41 radiates heat in the indoor heat exchanger 41 by exchanging heat with indoor air supplied from the indoor fan 42, and becomes a high-pressure liquid refrigerant. Consequently, the indoor air is heated. Then, the heated air is supplied to the inside of a room, thereby heating the inside of the room.

The high-pressure liquid refrigerant that has radiated heat in the indoor heat exchanger 41 is sent to the expansion valve 26 via the liquid-refrigerant connection pipe 5 and the liquid-side shutoff valve 27.

The high-pressure liquid refrigerant sent to the expansion valve 26 is decompressed to a low pressure of the refrigeration cycle by the expansion valve 26 and becomes a low-pressure gas-liquid two-phase refrigerant. The low-pressure gas-liquid two-phase refrigerant decompressed in the expansion valve 26 is sent to the outdoor heat exchanger 23.

The low-pressure gas-liquid two-phase refrigerant sent to the outdoor heat exchanger 23 evaporates in the outdoor heat exchanger 23 by exchanging heat with outdoor air supplied from the outdoor fan 36, and becomes a low-pressure gas refrigerant.

The low-pressure refrigerant that has evaporated in the outdoor heat exchanger 23 is sucked again by the compressor 21 through the four-way switching valve 22.

(3) Selection of Heat Exchangers

Figure 2:
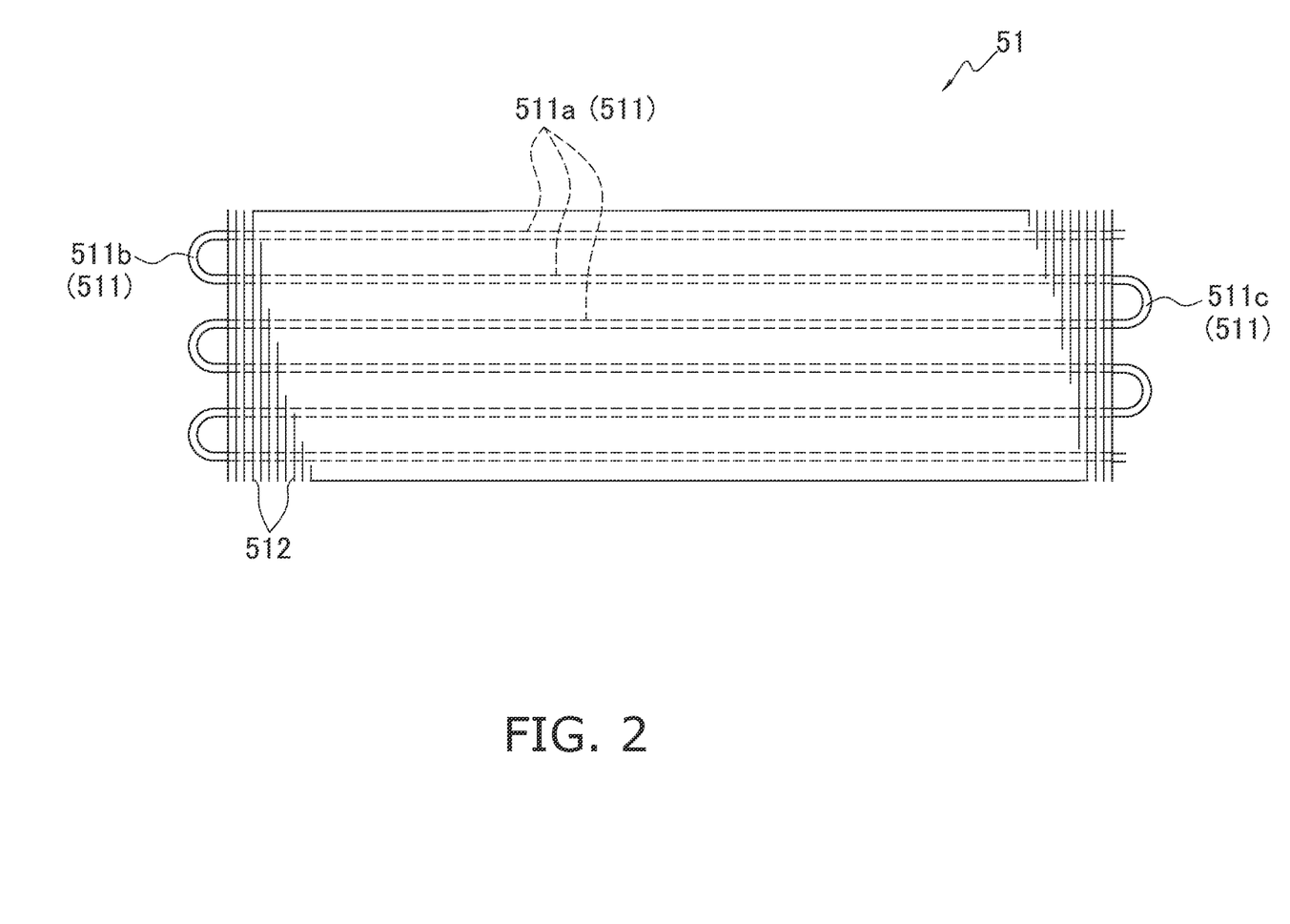
FIG. 2 is a schematic front view of a cross-fin-type heat exchanger.
Figure 3:
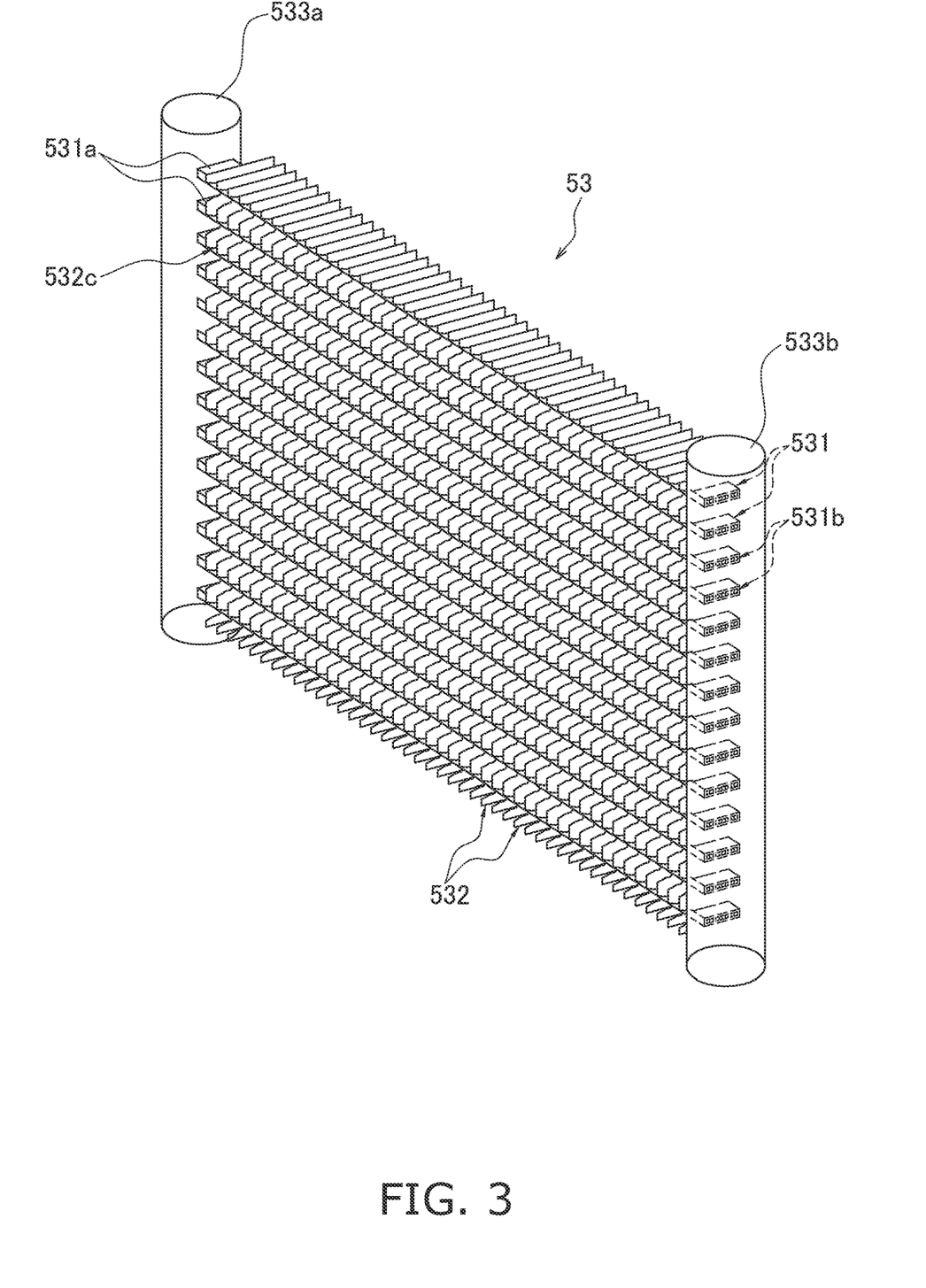
FIG. 3 is an external perspective view of a stack-type heat exchanger.

Here, an outline of the cross-fin-type heat exchanger or the stack-type heat exchanger employed in the indoor heat exchanger 41 and the outdoor heat exchanger 23 will be described.

(3-1) Outline of Cross-Fin-Type Heat Exchanger

FIG. 2 is a front view of a cross-fin-type heat exchanger 51. In FIG. 2, the cross-fin-type heat exchanger 51 has a heat transfer fin 512 and a heat transfer tube 511.

The heat transfer fin 512 is a thin aluminum flat plate. The heat transfer fin 512 has a plurality of through holes. The heat transfer tube 511 has a straight tube 511a inserted into the through holes of the heat transfer fin 512, and U-shaped tubes 511b and 511c that couple end portions of mutually adjacent straight tubes 511a to each other.

The straight tube 511a is in close contact with the heat transfer fin 512 by being subjected to tube expansion processing after inserted into the through holes of the heat transfer fin 512. The straight tube 511a and the first U-shaped tube 511b are formed integrally with each other. The second U-shaped tube 511c is coupled to an end portion of the straight tube 511a by welding, brazing, or the like after the straight tube 511a is inserted into the through holes of the heat transfer fin 512 and subjected to tube expansion processing.

(3-2) Outline of Stack-Type Heat Exchanger

FIG. 3 is an external perspective view of a stack-type heat exchanger 53. In FIG. 3, the stack-type heat exchanger 53 includes a plurality of flat pipes 531 and a plurality of heat transfer fins 532.

(3-2-1) Flat Pipe 531

Each flat pipe 531 is a multi-hole pipe. The flat pipe 531 is formed of aluminum or an aluminum alloy and has a flat portion 531a that serves as a heat transfer surface, and a plurality of internal flow paths 531b in which the refrigerant flows.

The flat pipes 531 are arrayed in a plurality of stages to be stacked with a gap (ventilation space) therebetween in a state in which respective flat portions 531a are directed upward/downward.

(3-2-2) Heat Transfer Fin 532

Each heat transfer fin 532 is a fin made of aluminum or an aluminum alloy. The heat transfer fin 532 is disposed in a ventilation space between the flat pipes 531 vertically adjacent to each other and is in contact with the flat portions 531a of the flat pipes 531.

The heat transfer fin 532 has a cutout 532c into which the flat pipes 531 are inserted. After the flat pipes 531 are inserted into the cutouts 532c of the heat transfer fins 532, the heat transfer fins 532 and the flat portions 531a of the flat pipes 531 are joined to each other by brazing or the like.

(3-2-3) Headers 533a and 533b

The headers 533a and 533b are coupled to both ends of the flat pipes 531 arrayed in the plurality of stages in the up-down direction. The headers 533a and 533b have a function of supporting the flat pipes 531, a function of guiding the refrigerant to the internal flow paths of the flat pipes 531, and a function of gathering the refrigerant that has flowed out from the internal flow paths.

When the stack-type heat exchanger 53 functions as an evaporator for the refrigerant, the refrigerant flows into the first header 533a. The refrigerant that has flowed into the first header 533a is distributed to the internal flow paths 531b of the flat pipes 531 of the stages substantially evenly and flows toward the second header 533b. The refrigerant that flows in the internal flow paths of the flat pipes 531 of the stages absorbs via the heat transfer fins 532 heat from an air flow that flows in the ventilation spaces. The refrigerant that has flowed in the internal flow paths of the flat pipes 531 of the stages gathers at the second header 533b and flows out from the second header 533b.

When the stack-type heat exchanger 53 functions as a radiator for the refrigerant, the refrigerant flows into the second header 533b. The refrigerant that has flowed into the second header 533b is distributed to the internal flow paths 531b of the flat pipes 531 of the stages substantially evenly and flows toward the first header 533a. The refrigerant that flows in the internal flow paths of the flat pipes 531 of the stages radiates via the heat transfer fins 532 heat into an air flow that flows in the ventilation space. The refrigerant that has flowed in the internal flow paths of the flat pipes 531 of the stages gathers at the first header 533a and flows out from the first header 533a.

(4) Volume Ratio S of Outdoor Heat Exchanger to Indoor Heat Exchanger (4-1) Influence of HFO-based Refrigerant In the air conditioning apparatus 1 according to one or more embodiments, one indoor unit 4 is operated by one outdoor unit 2.

In such an air conditioning apparatus, generally, the volume of the outdoor heat exchanger is larger than the volume of the indoor heat exchanger.

This is because a temperature difference between an ambient temperature and an evaporation temperature or a condensation temperature is set to be smaller for the outdoor heat exchanger. In particular, in the outdoor heat exchanger during heating operation, a difference between the evaporation temperature and the ambient temperature is extremely small to suppress frost as much as possible.

Due to the circumstance described above, a volume difference between the indoor heat exchanger and the outdoor heat exchanger is generated. For example, even when an amount of the refrigerant is determined such that the amount of the refrigerant does not become insufficient during heating operation in which the indoor heat exchanger having a smaller volume than the outdoor heat exchanger serves as a condenser, the refrigerant becomes insufficient during cooling operation, and subcooling tends to be not performed at the outlet of the condenser.

Therefore, generally, a proper refrigerant amount is determined in consideration of an influence of excess and insufficiency of the refrigerant amount.

However, when an HFO-based refrigerant is enclosed instead of the refrigerant of an air conditioning apparatus (hereinafter referred to as the HFC machine) using a HFC-based refrigerant, the refrigerant amount becomes more excessive in heating operation when the refrigerant amount is regulated such that the degree of subcooling is the same as that in the HFC machine in cooling operation. When the refrigerant amount is regulated such that the degree of subcooling is the same as that in the HFC machine in heating operation, the refrigerant amount becomes more insufficient in cooling operation, in particular, under a low load condition.

This is due to that the liquid-gas average density, in particular, the gas density at a pressure higher than the HFC refrigerant is larger in the HFO-based refrigerant than in the HFC refrigerant. When the degree of subcooling is the same, the holding amount of the refrigerant in the heat exchanger is large.

As described above, when an HFO-based refrigerant is used in an air conditioning apparatus, the apparatus easily, compared with an existing machine, enters a state in which the refrigerant amount is excessive or insufficient due to the "difference in the volume ratio between the indoor heat exchanger and the outdoor heat exchanger" and the "difference in the liquid-gas average density at a high pressure".

(4-2) Target Model

Here, the upper limit of the volume ratio S is set to avoid incorrect design of the volume ratio S of the outdoor heat exchanger 23 to the indoor heat exchanger 41 when an HFO-based refrigerant is used in the air conditioning apparatus.

Figure 4:
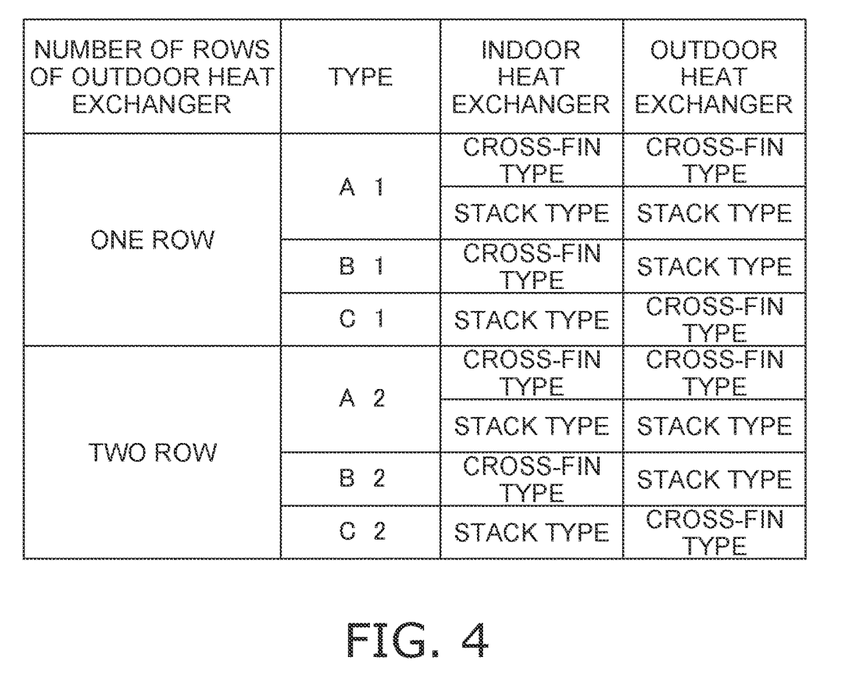
FIG. 4 is a table of target models of upper limit setting of the volume ratio.

FIG. 4 is a table of target models of upper limit setting of the volume ratio S. In FIG. 4, first, the outdoor heat exchanger is generally categorized into a type in which the outdoor heat exchanger 23 is a one-row heat exchanger and a type in which the outdoor heat exchanger 23 is a two-row heat exchanger.

(4-2-1) Types A1, B1, and C1

Next, on the premise that the outdoor heat exchanger 23 is a one-row heat exchanger, a combination of types of heat exchangers is categorized for the indoor heat exchanger 41 and the outdoor heat exchanger 23 into three types of a type A1, a type B1, and a type C1.

In the type A1, both the indoor heat exchanger 41 and the outdoor heat exchanger 23 are of the cross-fin type or the stack type. In the type B1, the indoor heat exchanger 41 is of the cross-fin type, and the outdoor heat exchanger 23 is of the stack type. In Type C1, the indoor heat exchanger 41 is of the stack type, and the outdoor heat exchanger 23 is of the cross-fin type.

(4-2-2) Types A2, B2, and C2

Next, on the premise that the outdoor heat exchanger 23 is a two-row heat exchanger, a combination of types of heat exchangers is categorized for the indoor heat exchanger 41 and the outdoor heat exchanger 23 into three types of a type A2, a type B2, and a type C2.

In the type A2, both the indoor heat exchanger 41 and the outdoor heat exchanger 23 are of the cross-fin type or the stack type. In the type B2, the indoor heat exchanger 41 is of the cross-fin type, and the outdoor heat exchanger 23 is of the stack type. In the type C2, the indoor heat exchanger 41 is of the stack type, and the outdoor heat exchanger 23 is of the cross-fin type.

(4-3) Upper limit of Volume Ratio S of Types A1, B1, and C1

To determine the volume ratio S of the outdoor heat exchanger 23 to the indoor heat exchanger 41 in a refrigerant circuit that uses an HFO-based refrigerant, the volume ratio of an outdoor heat exchanger to an indoor heat exchanger in a refrigerant circuit that uses HFC-32 (hereinafter referred to as R32), which is an existing refrigerant serving as a comparative reference will be described.

(4-3-1) Type A1

As a premise, both the indoor heat exchanger 41 and the outdoor heat exchanger 23 are of the cross-fin type or the stack type, the outdoor heat exchanger 23 is a one-row heat exchanger, the indoor heat exchanger 41 is a two-row heat exchanger, and the operating mode is heating operation.

A heat exchanging capacity Qc of the indoor heat exchanger 41 and a heat exchanging capacity Qe of the outdoor heat exchanger 23 during heating operation are generally expressed by the following expressions.

Qc=K×Ac×ΔTc
Qe=K×Ae×ΔTe

K: heat-transfer coefficient (frontal area reference)
Ac: frontal area of indoor heat exchanger 41
Ae: frontal area of outdoor heat exchanger 23
ΔTc: difference between condensation temperature and heating reference indoor temperature
ΔTe: difference between heating reference outdoor temperature and evaporation temperature If the condensation temperature is approximately 43° C. and the heating reference indoor temperature is 20° C., ΔTc=23 is satisfied. If the heating reference outdoor temperature is 6° C. and the evaporation temperature is approximately 0° C., ΔTe=6 is satisfied.

Therefore, the following expressions are satisfied.

$$Qc=K \times Ac \times 23 \quad [1]$$

$$Qe=K \times Ae \times 6 \quad [2]$$

When the coefficient of performance (COP) during heating operation is 5, the following expression is satisfied.

$$Qc/Qe \approx 5/4 \quad [3]$$

From the expressions [1], [2], and [3], the following expression is satisfied.

$$Ac/Ae \approx 1/3$$

This is the upper limit of the volume ratio S.

Therefore, the upper limit of the volume ratio S of the outdoor heat exchanger to the indoor heat exchanger in the refrigerant circuit that uses R32 is 300%.

The liquid-gas average density ρ of an HFO-based refrigerant in a condensation region is larger than that of R32. Here, the liquid-gas average density ρ is defined as an average value of a saturated liquid density and a saturated gas density at a temperature of 45° C.

When the liquid-gas average density of R32 is ρR32, and the liquid-gas average density of an HFO-based refrigerant is ρHFO, a required volume of the outdoor heat exchanger 23 is [ρR32/ρHFO] times the volume of the outdoor heat exchanger that uses R32.

Therefore, based on the liquid-gas average density of HFO-based refrigerants of several types, the upper limit of the volume ratio S corresponding to each of the HFO-based refrigerants can be calculated.

Figure 5A:
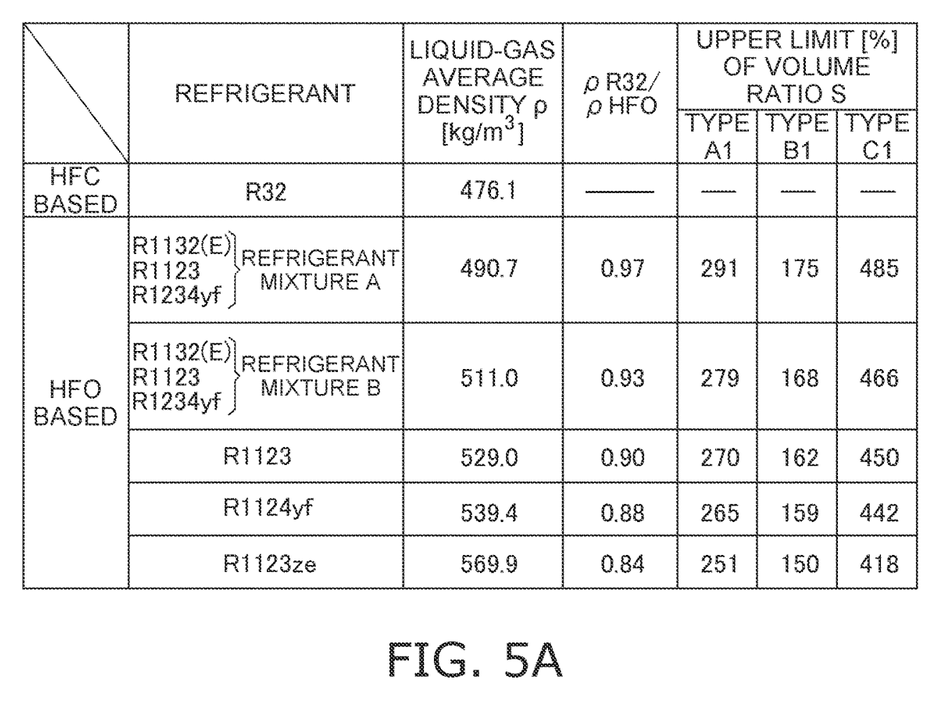
FIG. 5A is a table showing a relationship between the liquid-gas average density of an HFO-based refrigerant and the upper limit of a volume ratio S of an outdoor heat exchanger to an indoor heat exchanger when the outdoor heat exchanger is a one-row heat exchanger.

FIG. 5A is a table showing a relationship between the liquid-gas average density ρ of an HFO-based refrigerant and the upper limit of the volume ratio S of the outdoor heat exchanger 23 to the indoor heat exchanger 41 when the outdoor heat exchanger 23 is a one-row heat exchanger. In FIG. 5A, a refrigerant mixture A, a refrigerant mixture B, R1123, R1234yf, and R1234ze are selected as HFO-based refrigerants for comparison with the liquid-gas average density of a HFC-based refrigerant of R32. Then, the liquid-gas average density, ρR32/ρHFO, and the upper limit of the volume ratio S for each refrigerant are obtained and described.

Both of the refrigerant mixture A and the refrigerant mixture B are refrigerant mixtures of R1132(E), R1123, and R1234yf but are different from each other in a three-component composition diagram. However, details will not be described in the present application.

(4-3-2) Type B1

As a premise, the indoor heat exchanger 41 is of the cross-fin type, the outdoor heat exchanger 23 is of the stack type, the outdoor heat exchanger 23 is a one-row heat exchanger, the indoor heat exchanger 41 is a two-row heat exchanger, and the operating mode is heating operation.

As described for the type A1, when both the indoor heat exchanger and the outdoor heat exchanger are of the cross-fin type in the refrigerant circuit that uses R32, the upper limit of the volume ratio S of the outdoor heat exchanger to the indoor heat exchanger is 300%.

In general, the volume ratio of a stack-type heat exchanger to a cross-fin-type heat exchanger is α (α<1; or, α=0.6). Therefore, when the indoor heat exchanger is of the cross-fin type and the outdoor heat exchanger is of the stack type in the refrigerant circuit that uses R32, the upper limit of the volume ratio S of the outdoor heat exchanger to the indoor heat exchanger is 300×α%.

Therefore, the upper limit of the volume ratio S corresponding to an HFO-based refrigerant can be calculated by multiplying 300×α% by [ρR32/ρHFO].

In FIG. 5A, the upper limit of the volume ratio S in the type B1 is obtained for each of the refrigerant mixture A, the refrigerant mixture B, R1123, R1234yf, and R1234ze. The calculations are based on that α=0.6.

(4-3-3) Type C1

As a premise, the indoor heat exchanger 41 is of the stack type, the outdoor heat exchanger 23 is of the cross-fin type, the outdoor heat exchanger 23 is a one-row heat exchanger, the indoor heat exchanger 41 is a two-row heat exchanger, and the operating mode is heating operation.

As described for the type A1, when both the indoor heat exchanger and the outdoor heat exchanger are of the cross-fin type in the refrigerant circuit that uses R32, the upper limit of the volume ratio S of the outdoor heat exchanger to the indoor heat exchanger is 300%.

In general, the volume ratio of a stack-type heat exchanger to a cross-fin-type heat exchanger is α (α<1; or, α=0.6). Therefore, when the indoor heat exchanger is of the stack type and the outdoor heat exchanger is of the cross-fin type in the refrigerant circuit that uses R32, the upper limit of the volume ratio S of the outdoor heat exchanger to the indoor heat exchanger is 300/a %.

Therefore, the upper limit of the volume ratio S corresponding to an HFO-based refrigerant can be calculated by multiplying 300/α % by [ρR32/ρHFO].

In FIG. 5A, the upper limit of the volume ratio S in the type C1 is obtained for each of the refrigerant mixture A, the refrigerant mixture B, R1123, R1234yf, and R1234ze. The calculations are based on that α=0.6.

Figure 5B:
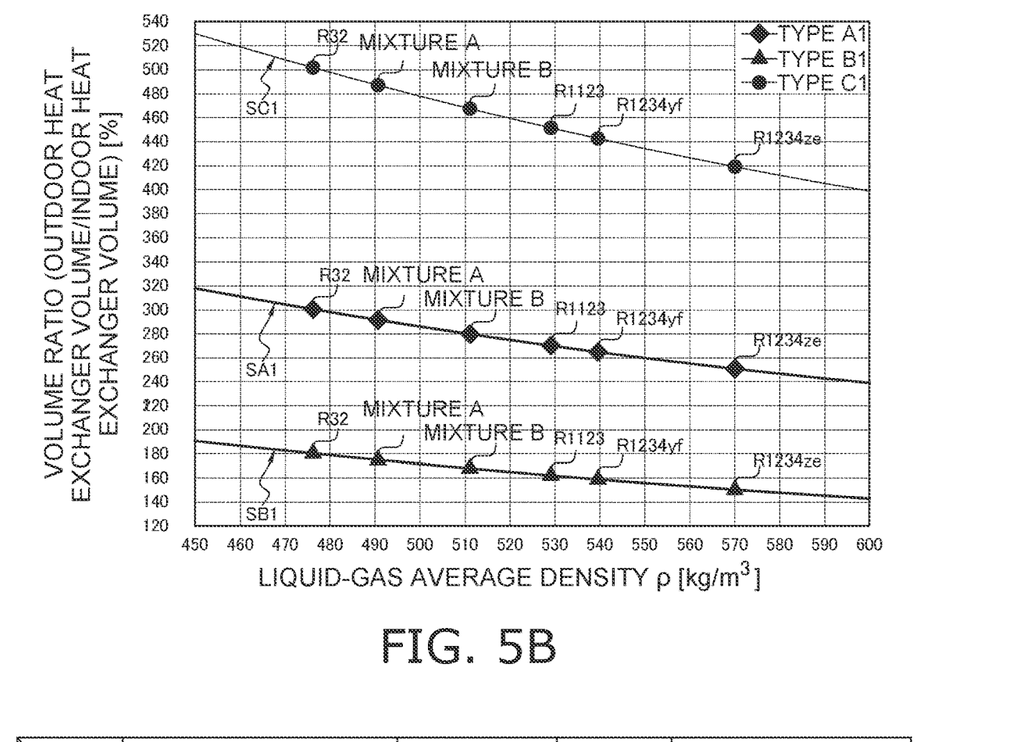
FIG. 5B is a graph showing a relationship between the liquid-gas average density of an HFO-based refrigerant and the upper limit of the volume ratio S of the outdoor heat exchanger to the indoor heat exchanger when the outdoor heat exchanger is a one-row heat exchanger.

FIG. 5B is a graph showing a relationship between the liquid-gas average density ρ of an HFO-based refrigerant and the upper limit of the volume ratio S of the outdoor heat exchanger 23 to the indoor heat exchanger 41 when the outdoor heat exchanger 23 is a one-row heat exchanger. In FIG. 5B, the horizontal axis of the graph indicates a liquid-gas average density [kg/m$^3$]. The vertical axis of the graph indicates the upper limit of the volume ratio S of the outdoor heat exchanger 23 to the indoor heat exchanger 41.

A curve SA1 is a curve that is obtained by plotting the upper limits of the volume ratios S of R32, the refrigerant mixture A, the refrigerant mixture B, R1123, R1234yf, and R1234z for the type A1. The curve SA1 is expressed by "1.0112E−03×ρ^2−1.5836E+00×ρ+8.2472E+02", and a relationship to the volume ratio S is as follows.

$$100 \leq S \leq 1.0112E{-}03 \times \rho^2 - 1.5836E{+}00 \times \rho + 8.2472E{+}02$$

Similarly, a curve SB1 is a curve that is obtained by plotting the upper limits of the volume ratios S of R32, the refrigerant mixture A, the refrigerant mixture B, R1123, R1234yf, and R1234z for the type B1.

The curve SB1 is expressed by "(1.0112E−03×ρ^2−1.5836E+00×ρ+8.2427E+02)× α", and a relationship to the volume ratio S is thus as follows.

$$100 \times \alpha \leq S \leq (1.0112E{-}03 \times \rho^2 - 1.5836E{+}00 \times \rho + 8.2427E{+}02) \times \alpha$$

Similarly, a curve SC1 is a curve that is obtained by plotting the upper limits of the volume ratios S of R32, the refrigerant mixture A, the refrigerant mixture B, R1123, R1234yf, and R1234z for the type C1.

The curve SC1 is expressed by "(1.0112E−03×ρ^2−1.5836E+00×ρ+8.2472E+02)/α", and a relationship to the volume ratio S is thus as follows.

$$100/\alpha \leq S \leq (1.0112E{-}03 \times \rho^2 - 1.5836E{+}00 \times \rho + 8.2472E{+}02)/\alpha$$

(4-4) Upper Limits of Volume Ratios S of Types A2, B2, and C2

(4-4-1) Type A2

As a premise, both the indoor heat exchanger 41 and the outdoor heat exchanger 23 are of the cross-fin type or the stack type, the outdoor heat exchanger 23 is a two-row heat exchanger, the indoor heat exchanger 41 is a three-row heat exchanger, and the operating mode is heating operation.

In such a case, the frontal area Ae of the outdoor heat exchanger is two times the frontal area Ae in the type A1, and the frontal area Ac of the indoor heat exchanger is 1.5 times the frontal area Ac in the type A1. Since "Ac/Ae≈⅓" is satisfied in the type A1, Ac/Ae≈(⅓)×(1.5/2)=¼ is satisfied in the type A2.

Therefore, the upper limit of the volume ratio S of the outdoor heat exchanger to the indoor heat exchanger in the refrigerant circuit that uses R32 is 400%.

The liquid-gas average density ρ of an HFO-based refrigerant in a condensation region is larger than that of R32. Here, the liquid-gas average density ρ is defined as an average value of a saturated liquid density and a saturated gas density at a temperature of 45° C.

When the liquid-gas average density of R32 is ρR32, and the liquid-gas average density of an HFO-based refrigerant is ρHFO, a required volume of the outdoor heat exchanger is [ρR32/ρHFO] times the volume of the outdoor heat exchanger that uses R32.

Therefore, based on the liquid-gas average density of HFO-based refrigerants of several types, the upper limit of the volume ratio S corresponding to each of the HFO-based refrigerants can be calculated.

Figure 6A:
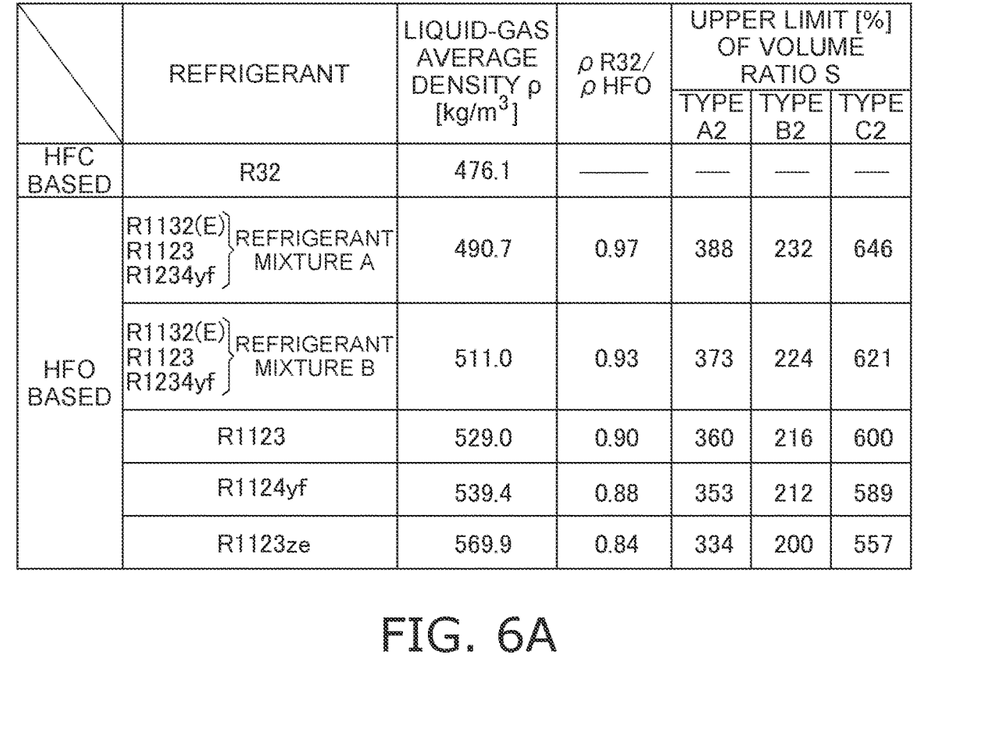
FIG. 6A is a table showing a relationship between the liquid-gas average density of an HFO-based refrigerant and the upper limit of the volume ratio of the outdoor heat exchanger to the indoor heat exchanger when the outdoor heat exchanger is a two-row heat exchanger.

FIG. 6A is a table showing a relationship between the liquid-gas average density ρ of an HFO-based refrigerant and the upper limit of the volume ratio S of the outdoor heat exchanger 23 to the indoor heat exchanger 41 when the outdoor heat exchanger 23 is a two-row heat exchanger. In FIG. 6A, the refrigerant mixture A, the refrigerant mixture B, R1123, R1234yf, and R1234ze are selected as HFO-based refrigerants for comparison with the liquid-gas average density of a HFC-based refrigerant of R32. Then, the liquid-gas average density, ρR32/ρHFO, and the upper limit of the volume ratio S for each refrigerant are obtained and described.

Both of the refrigerant mixture A and the refrigerant mixture B are refrigerant mixtures of R1132(E), R1123, and R1234yf but are different from each other in a three-component composition diagram. However, details will not be described in the present application.

(4-4-2) Type B2

As a premise, the indoor heat exchanger 41 is of the cross-fin type, the outdoor heat exchanger 23 is of the stack type, the outdoor heat exchanger 23 is a two-row heat exchanger, the indoor heat exchanger 41 is a three-row heat exchanger, and the operating mode is heating operation.

As described for type A2, when both the indoor heat exchanger and the outdoor heat exchanger are of the cross-fin type in the refrigerant circuit that uses R32, the upper limit of the volume ratio S of the outdoor heat exchanger to the indoor heat exchanger is 400%.

In general, the volume ratio of a stack-type heat exchanger to a cross-fin-type heat exchanger is α (α<1; or, α=0.6). Therefore, when the indoor heat exchanger is of the cross-fin type and the outdoor heat exchanger is of the stack type in the refrigerant circuit that uses R32, the upper limit of the volume ratio S of the outdoor heat exchanger to the indoor heat exchanger is 400×α%.

Therefore, the upper limit of the volume ratio S corresponding to an HFO-based refrigerant can be calculated by multiplying 400×α % by [ρR32/ρHFO].

In FIG. 6A, the upper limit of the volume ratio S in the type B1 is obtained for each of the refrigerant mixture A, the refrigerant mixture B, R1123, R1234yf, and R1234ze. The calculations are based on that α=0.6.

(4-4-3) Type C2

As a premise, the indoor heat exchanger 41 is of the stack type, the outdoor heat exchanger 23 is of the cross-fin type, the outdoor heat exchanger 23 is a two-row heat exchanger, the indoor heat exchanger 41 is a three-row heat exchanger, and the operating mode is heating operation.

As described for type A2, when both the indoor heat exchanger and the outdoor heat exchanger are of the cross-fin type in the refrigerant circuit that uses R32, the upper limit of the volume ratio S of the outdoor heat exchanger to the indoor heat exchanger is 400%.

In general, the volume ratio of a stack-type heat exchanger to a cross-fin-type heat exchanger is α (α<1; or, α=0.6). Therefore, when the indoor heat exchanger is of the stack type and the outdoor heat exchanger is of the cross-fin type in the refrigerant circuit that uses R32, the upper limit of the volume ratio S of the outdoor heat exchanger to the indoor heat exchanger is 400/α %.

Therefore, the upper limit of the volume ratio S corresponding to an HFO-based refrigerant can be calculated by multiplying 400/α % by [ρR32/ρHFO].

In FIG. 6A, the upper limit of the volume ratio S in the type C1 is obtained for each of the refrigerant mixture A, the refrigerant mixture B, R1123, R1234yf, and R1234ze. The calculations are based on that α=0.6.

Figure 6B:
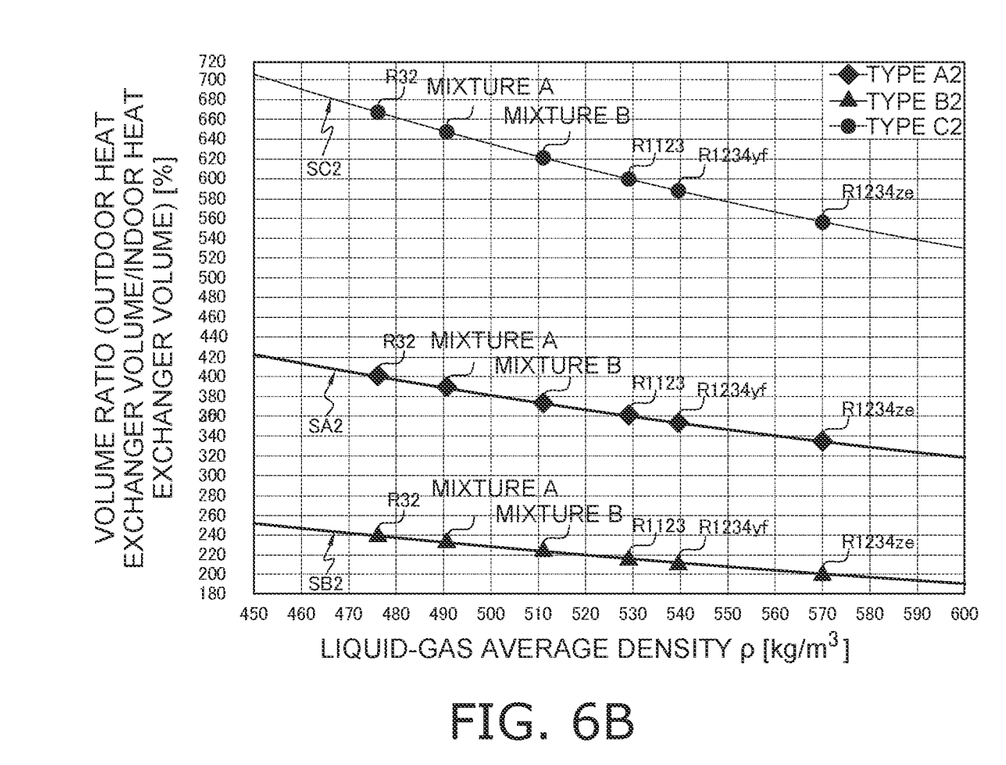
FIG. 6B is a graph showing a relationship between the liquid-gas average density of an HFO-based refrigerant and the upper limit of the volume ratio of the outdoor heat exchanger to the indoor heat exchanger when the outdoor heat exchanger is a two-row heat exchanger.

FIG. 6B is a graph showing a relationship between the liquid-gas average density ρ of an HFO-based refrigerant and the upper limit of the volume ratio S of the outdoor heat exchanger 23 to the indoor heat exchanger 41 when the outdoor heat exchanger 23 is a two-row heat exchanger. In FIG. 6B, the horizontal axis of the graph indicates the liquid-gas average density ρ [kg/m$^3$]. The vertical axis of the graph indicates the upper limit of the volume ratio S of the outdoor heat exchanger 23 to the indoor heat exchanger 41.

A curve SA2 is a curve that is obtained by plotting the upper limits of the volume ratios S of R32, the refrigerant mixture A, the refrigerant mixture B, R1123, R1234yf, and R1234z for the type A2. The curve SA2 is expressed by "1.3483E−03×ρ^2−2.1115E+00×ρ+1.0996E+03", and a relationship to the volume ratio S is as follows.

$$130 \le S \le 1.3483E{-}03 \times \rho^{\wedge}2 - 2.1115E{+}00 \times \rho + 1.0996E{+}03$$

Similarly, a curve SB2 is a curve that is obtained by plotting the upper limits of the volume ratios S of R32, the refrigerant mixture A, the refrigerant mixture B, R1123, R1234yf, and R1234z for the type B2.

The curve SB1 is expressed by $(1.3483E{-}03 \times \rho^{\wedge}2 - 2.1115E{+}00 \times \rho + 1.0996E{+}03) \times \alpha$, and a relationship to the volume ratio S is thus as follows.

$$130 \times \alpha \le S \le (1.3483E{-}03 \times \rho^{\wedge}2 - 2.1115E{+}00 \times \rho + 1.0996E{+}03) \times \alpha$$

Similarly, a curve SC2 is a curve that is obtained by plotting the upper limits of the volume ratios S of R32, the refrigerant mixture A, the refrigerant mixture B, R1123, R1234yf, and R1234z for the type C2.

The curve SC1 is expressed by $(1.3483E{-}03 \times \rho^{\wedge}2 - 2.1115E{+}00 \times \rho + 1.0996E{+}03)/\alpha$, and a relationship to the volume ratio S is thus as follows.

$$130/\alpha \le S \le (1.3483E{-}03 \times \rho^{\wedge}2 - 2.1115E{+}00 \times \rho + 1.0996E{+}03)/\alpha$$

(5) Features (5-1)

Regarding a refrigeration apparatus that uses an HFO refrigerant or a refrigerant mixture including an HFO refrigerant, when a model in which the outdoor heat exchanger 23 is a one-row heat exchanger, the indoor heat exchanger 41 is a two-row heat exchanger, the operating mode is heating operation, and both the indoor heat exchanger 41 and the outdoor heat exchanger 23 are of the cross-fin type or the stack type is the type A1, a model in which the indoor heat exchanger 41 is of the cross-fin type and the outdoor heat exchanger 23 is of the stack type is the type B1, and a model in which the indoor heat exchanger 41 is of the stack type and the outdoor heat exchanger 23 is of the cross-fin type is the type C1, a relationship between the liquid-gas average density ρ and the volume ratio S in the type A1 is $$100 \le S \le 1.0112E{-}03 \times \rho^{\wedge}2 - 1.5836E{+}00 \times \rho + 8.2472E{+}02,$$

a relationship between the liquid-gas average density ρ and the volume ratio S in the type B1 is $$100 \times \alpha \le S \le (1.0112E{-}03 \times \rho^{\wedge}2 - 1.5836E{+}00 \times \rho + 8.2427E{+}02) \times \alpha, \text{ and}$$

a relationship between the liquid-gas average density ρ and the volume ratio S in the type C1 is $$100/\alpha \le S \le (1.0112E{-}03 \times \rho^{\wedge}2 - 1.5836E{+}00 \times \rho + 8.2472E{+}02)/\alpha.$$

Note that a is a volume ratio of a stack-type heat exchanger to a cross-fin-type heat exchanger when the cross-fin-type heat exchanger and the stack-type heat exchanger have identical heat exchange performance, and p [kg/m^3] is the average density of a saturated liquid gas at a condensation temperature of 45° C.

In this refrigeration apparatus, due to the volume ratio S of the outdoor heat exchanger to the indoor heat exchanger being set to a value that satisfies the aforementioned relational expression, excess and insufficiency of the refrigerant amount during cooling operation and heating operation are suppressed.

(5-2)

Regarding a refrigeration apparatus in which an HFO refrigerant or a refrigerant mixture including an HFO refrigerant flows, when a model in which the outdoor heat exchanger 23 is a two-row heat exchanger, the indoor heat exchanger 41 is a three-row heat exchanger, the operating mode is heating operation, and both the indoor heat exchanger 41 and the outdoor heat exchanger 23 are of the cross-fin type or the stack type is the type A2, a model in which the indoor heat exchanger 41 is of the cross-fin type and the outdoor heat exchanger 23 is of the stack type is the type B2, and a model in which the indoor heat exchanger 41 is of the stack type and the outdoor heat exchanger 23 is of the cross-fin type is the type C2, a relationship between the liquid-gas average density ρ and the volume ratio S in the type A2 is $$130 \le S \le 1.3483E{-}03 \times \rho^{\wedge}2 - 2.1115E{+}00 \times \rho + 1.0996E{+}03,$$

a relationship between the liquid-gas average density ρ and the volume ratio S in the type B2 is $$130 \times \alpha \le S \le (1.3483E{-}03 \times \rho^{\wedge}2 - 2.1115E{+}00 \times \rho + 1.0996E{+}03) \times \alpha, \text{ and}$$

a relationship between the liquid-gas average density ρ and the volume ratio S in the type C2 is $$130/\alpha \le S \le (1.3483E{-}03 \times \rho^{\wedge}2 - 2.1115E{+}00 \times \rho + 1.0996E{+}03)/\alpha.$$

Note that a is a volume ratio of a stack-type heat exchanger to a cross-fin-type heat exchanger when the cross-fin-type heat exchanger and the stack-type heat exchanger have identical heat exchange performance, and ρ [kg/m^3] is the average density of a saturated liquid gas at a condensation temperature of 45° C.

In this refrigeration apparatus, due to the volume ratio S of the outdoor heat exchanger to the indoor heat exchanger being set to a value that satisfies the aforementioned relational expression, excess and insufficiency of the refrigerant amount during cooling operation and heating operation are suppressed.

(5-3)

The expression of 476.1<ρ is satisfied.

(5-4)

An HFO refrigerant is any of R1132(E), R1123, R1234yf, and R1234ze.

(6) Modifications

Figure 7:
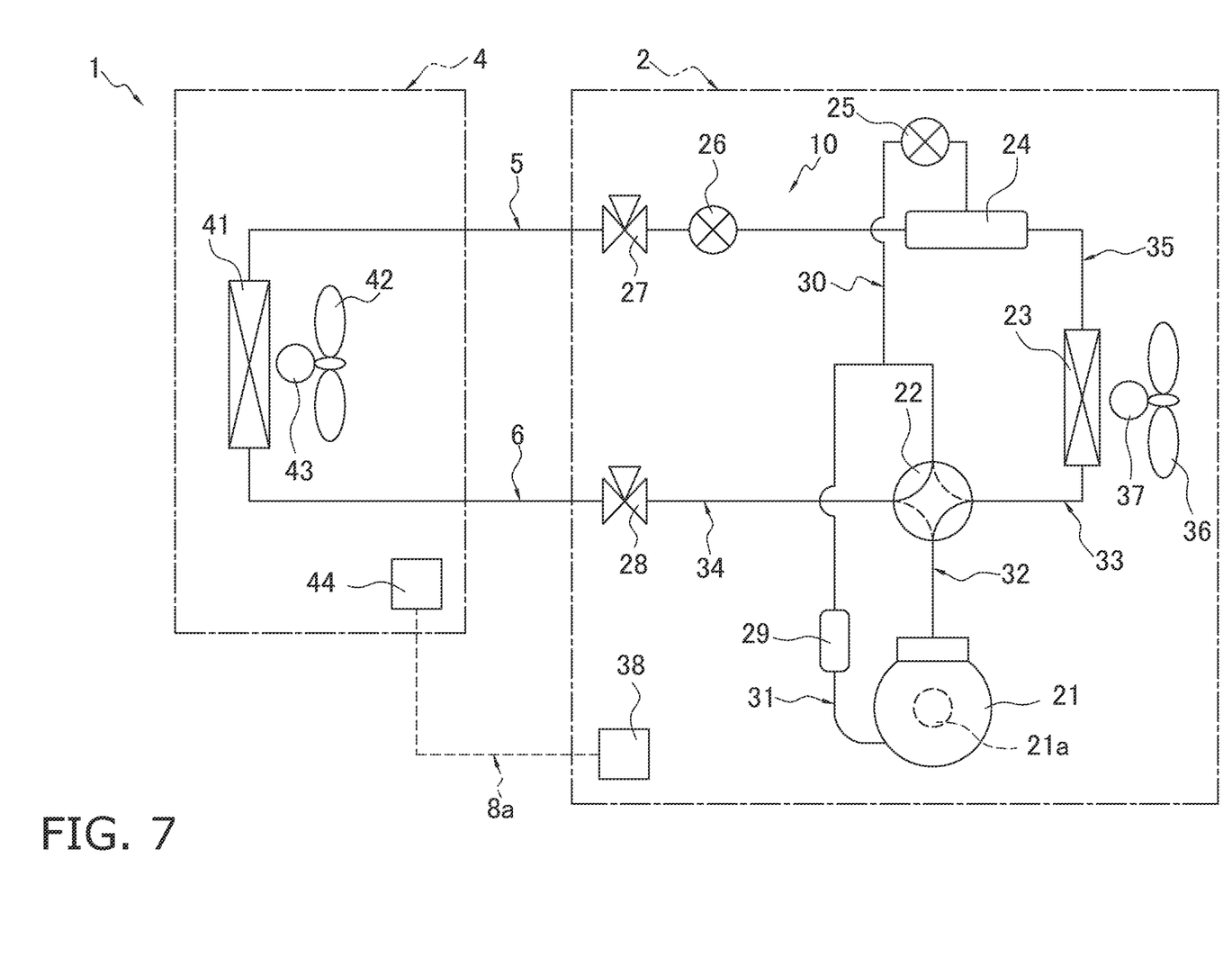
FIG. 7 is a schematic diagram of an air conditioning apparatus as a refrigeration apparatus according to a modification of the present disclosure.

FIG. 7 is a schematic diagram of an air conditioning apparatus as a refrigeration apparatus according to a modification of the present disclosure. In FIG. 7, a difference from one or more embodiments in FIG. 1 is a feature of including a receiver 24 that is connected between the outdoor heat exchanger 23 of the refrigerant circuit 10 and the expansion valve 26; a bypass pipe 30 that connects the receiver 24 and the suction pipe 31 to each other; and a flow-rate regulating valve 25 that is connected to an intermediate portion of the bypass pipe 30. Features other than the aforementioned feature are identical to those in one or more embodiments in FIG. 1. Thus, description thereof is omitted.

The receiver 24 is a container capable of storing an excess refrigerant. Generally, in a refrigerant circuit of an air conditioning apparatus, a refrigerant amount suitable during cooling operation differs from a refrigerant amount suitable during heating operation. Therefore, a proper volume of an outdoor heat exchanger that functions as a condenser during cooling operation differs from a proper volume of an indoor heat exchanger that functions as a condenser during heating operation.

Normally, the volume of the outdoor heat exchanger is larger than the volume of the indoor heat exchanger, and a refrigerant that is not possible to be accommodated in the indoor heat exchanger during heating operation is temporarily stored in the accumulator 29 or the like. An excess liquid refrigerant that is not possible to be accommodated in the accumulator 29 is accommodated in the receiver 24.

During heating operation, the refrigerant immediately before entering the receiver 24 includes a gas component generated when passing through the expansion valve 26. After entering the receiver 24, the refrigerant is separated into a liquid refrigerant and a gas refrigerant, and the liquid refrigerant and the gas refrigerant are stored on the lower side and the upper side, respectively.

The gas refrigerant separated in the receiver 24 flows into the suction pipe 31 through the bypass pipe 30. The liquid refrigerant separated in the receiver 24 flows into the outdoor heat exchanger 23. The flow-rate regulating valve 25 is connected to an intermediate portion of the bypass pipe 30. In the present modification, the flow-rate regulating valve 25 is an electric expansion valve.

When the indoor heat exchanger 41 is of the cross-fin type and the outdoor heat exchanger 23 is of the stack type, the volume of the outdoor heat exchanger 23 is smaller than the volume of the indoor heat exchanger, and a refrigerant (excess refrigerant) that is not possible to be accommodated in the outdoor heat exchanger 23 during cooling operation is generated. The amount of the refrigerant is more than an amount that can be stored in the accumulator 29 or the like.

In such a case, the receiver 24 accommodates an excess liquid refrigerant that is not possible to be accommodated in the outdoor heat exchanger 23 during cooling operation.

In the present modification, the volume of the outdoor heat exchanger 23 is considered a volume including the volume of the receiver 24 since the receiver 24 is provided between the outdoor heat exchanger 23 and the expansion valve 26.

(7) Definition of Terms

The volume of a heat exchanger denotes an internal volume that is from the refrigerant inlet to the refrigerant outlet of the heat exchanger itself and that can be filled with a refrigerant.

When the receiver 24 for storing a refrigerant is included, as in the aforementioned modification, the volume of the outdoor heat exchanger 23 denotes an internal volume that is from the refrigerant inlet of the outdoor heat exchanger 23 itself to the refrigerant outlet of the receiver 24 itself and that can be filled with a refrigerant.

Embodiments of the present disclosure have been described above; however, it should be understood that various changes in the forms and details are possible without departing from the gist and the scope of the present disclosure described in the claims.

The present disclosure is widely applicable to a refrigeration apparatus (for example, a low-temperature apparatus) capable of performing cooling operation and heating operation.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCES SIGNS LIST 1 air conditioning apparatus (refrigeration apparatus)
21 compressor
23 outdoor heat exchanger
24 receiver (high-pressure receiver)
26 expansion valve (expansion mechanism)
41 indoor heat exchanger

PATENT LITERATURE

PTL 1: Japanese Unexamined Patent Application Publication No. 2012-077983

What is claimed is:

1. A refrigeration apparatus comprising:
a compressor;
an outdoor heat exchanger connected to the compressor;
an indoor heat exchanger connected to the compressor; and
an expansion valve disposed between the outdoor heat exchanger and the indoor heat exchanger, wherein
in cooling operation, a refrigerant flows through the compressor, the outdoor heat exchanger, the expansion valve, and the indoor heat exchanger in this order,
in heating operation, the refrigerant flows through the compressor, the indoor heat exchanger, the expansion valve, and the outdoor heat exchanger in this order,
the refrigerant is an HFO (hydrofluoroolefin) refrigerant or a refrigerant mixture that includes an HFO refrigerant,
the indoor heat exchanger and the outdoor heat exchanger are cross-fin-type heat exchangers or stack-type heat exchangers,
the outdoor heat exchanger has a one-row configuration, and $$100 \leq S \leq 1.0112E{-}03 \times \rho^2 - 1.5836E{+}00 \times \rho + 8.2472E{+}02$$

where
S [%] is a volume ratio of the outdoor heat exchanger to the indoor heat exchanger, and
$\rho$ [kg/m^3] is an average density of a saturated liquid gas of the refrigerant at a condensation temperature of 45° C.

2. A refrigeration apparatus comprising:
a compressor;
an outdoor heat exchanger connected to the compressor;
an indoor heat exchanger connected to the compressor; and
an expansion valve disposed between the outdoor heat exchanger and the indoor heat exchanger, wherein
in cooling operation, a refrigerant flows through the compressor, the outdoor heat exchanger, the expansion valve, and the indoor heat exchanger in this order,
in heating operation, the refrigerant flows through the compressor, the indoor heat exchanger, the expansion valve, and the outdoor heat exchanger in this order,
the refrigerant is an HFO (hydrofluoroolefin) refrigerant or a refrigerant mixture that includes an HFO refrigerant,
the indoor heat exchanger and the outdoor heat exchanger are cross-fin-type heat exchangers or stack-type heat exchangers, the outdoor heat exchanger has a two-row configuration, and $$130 \leq S \leq 1.3483E{-}03 \times \rho^\wedge 2 - 2.1115E{+}00 \times \rho + 1.0996E{+}03$$

where
S [%] is a volume ratio of the outdoor heat exchanger to the indoor heat exchanger, and
ρ [kg/m^3] is an average density of a saturated liquid gas of the refrigerant at a condensation temperature of 45° C.

3. A refrigeration apparatus comprising:
a compressor;
an outdoor heat exchanger connected to the compressor;
an indoor heat exchanger connected to the compressor; and
an expansion valve disposed between the outdoor heat exchanger and the indoor heat exchanger, wherein
in cooling operation, a refrigerant flows through the compressor, the outdoor heat exchanger, the expansion valve, and the indoor heat exchanger in this order,
in heating operation, the refrigerant flows through the compressor, the indoor heat exchanger, the expansion valve, and the outdoor heat exchanger in this order,
the refrigerant is an HFO (hydrofluoroolefin) refrigerant or a refrigerant mixture that includes an HFO refrigerant,
the indoor heat exchanger is a cross-fin-type heat exchanger,
the outdoor heat exchanger is a stack-type heat exchanger,
the outdoor heat exchanger has a one-row configuration, and $$100 \times \alpha \leq S \leq (1.0112E{-}03 \times \rho^\wedge 2 - 1.5836E{+}00 \times \rho + 8.2427E{+}02) \times \alpha$$

where
S [%] is a volume ratio of the outdoor heat exchanger to the indoor heat exchanger,
α is a volume ratio of the stack-type heat exchanger to the cross-fin-type heat exchanger when the cross-fin-type heat exchanger and the stack-type heat exchanger have identical heat exchange performance, and
ρ [kg/m^3] is an average density of a saturated liquid gas of the refrigerant at a condensation temperature of 45° C.

4. A refrigeration apparatus comprising:
a compressor;
an outdoor heat exchanger connected to the compressor;
an indoor heat exchanger connected to the compressor; and
an expansion valve disposed between the outdoor heat exchanger and the indoor heat exchanger, wherein
in cooling operation, a refrigerant flows through the compressor, the outdoor heat exchanger, the expansion valve, and the indoor heat exchanger in this order,
in heating operation, the refrigerant flows through the compressor, the indoor heat exchanger, the expansion valve, and the outdoor heat exchanger in this order,
the refrigerant is an HFO (hydrofluoroolefin) refrigerant or a refrigerant mixture that includes an HFO refrigerant,
the indoor heat exchanger is a cross-fin-type heat exchanger,
the outdoor heat exchanger is a stack-type heat exchanger,
the outdoor heat exchanger has a two-row configuration, and $$130 \times \alpha \leq S \leq (1.3483E{-}03 \times \rho^\wedge 2 - 2.1115E{+}00 \times \rho + 1.0996E{+}03) \times \alpha$$

where
S [%] is a volume ratio of the outdoor heat exchanger to the indoor heat exchanger,
α is a volume ratio of the stack-type heat exchanger to the cross-fin-type heat exchanger when the cross-fin-type heat exchanger and the stack-type heat exchanger have identical heat exchange performance, and
ρ [kg/m^3] is an average density of a saturated liquid gas of the refrigerant at a condensation temperature of 45° C.

5. A refrigeration apparatus comprising:
a compressor;
an outdoor heat exchanger connected to the compressor;
an indoor heat exchanger connected to the compressor; and
an expansion valve disposed between the outdoor heat exchanger and the indoor heat exchanger, wherein
in cooling operation, a refrigerant flows through the compressor, the outdoor heat exchanger, the expansion valve, and the indoor heat exchanger in this order,
in heating operation, the refrigerant flows through the compressor, the indoor heat exchanger, the expansion valve, and the outdoor heat exchanger in this order,
the refrigerant is an HFO (hydrofluoroolefin) refrigerant or a refrigerant mixture that includes an HFO refrigerant,
the indoor heat exchanger is a stack-type heat exchanger,
the outdoor heat exchanger is a cross-fin-type heat exchanger,
the outdoor heat exchanger has a one-row configuration, and $$100/\alpha \leq S \leq (1.0112E{-}03 \times \rho^\wedge 2 - 1.5836E{+}00 \times \rho + 8.2472E{+}02)/\alpha$$

where
S [%] is a volume ratio of the outdoor heat exchanger to the indoor heat exchanger,
α is a volume ratio of the stack-type heat exchanger to the cross-fin-type heat exchanger when the cross-fin-type heat exchanger and the stack-type heat exchanger have identical heat exchange performance, and
ρ [kg/m^3] is an average density of a saturated liquid gas of the refrigerant at a condensation temperature of 45° C.

6. A refrigeration apparatus comprising:
a compressor;
an outdoor heat exchanger connected to the compressor;
an indoor heat exchanger connected to the compressor; and
an expansion valve disposed between the outdoor heat exchanger and the indoor heat exchanger, wherein
in cooling operation, a refrigerant flows through the compressor, the outdoor heat exchanger, the expansion valve, and the indoor heat exchanger in this order,
in heating operation, the refrigerant flows through the compressor, the indoor heat exchanger, the expansion valve, and the outdoor heat exchanger in this order,
the refrigerant is an HFO (hydrofluoroolefin) refrigerant or a refrigerant mixture that includes an HFO refrigerant,
the indoor heat exchanger is a stack-type heat exchanger,
the outdoor heat exchanger is a cross-fin-type heat exchanger, the outdoor heat exchanger has a two-row configuration, and $$130 \leq S \leq 1.3483E{-}03 \times \rho^2 - 2.1115E{+}00 \times \rho + 1.0996E{+}03$$

where
- $S$ [%] is a volume ratio of the outdoor heat exchanger to the indoor heat exchanger,
- $\alpha$ is a volume ratio of the stack-type heat exchanger to the cross-fin-type heat exchanger when the cross-fin-type heat exchanger and the stack-type heat exchanger have identical heat exchange performance, and
- $\rho$ [kg/m^3] is an average density of a saturated liquid gas of the refrigerant at a condensation temperature of 45° C.

7. The refrigeration apparatus according to claim 2, wherein
a pressure receiver is disposed between the outdoor heat exchanger and the expansion valve, and
a volume of the outdoor heat exchanger includes a volume of the pressure receiver.

8. The refrigeration apparatus according to claim 4, wherein
a pressure receiver is disposed between the outdoor heat exchanger and the expansion valve, and
a volume of the outdoor heat exchanger includes a volume of the pressure receiver.

9. The refrigeration apparatus according to claim 6, wherein
a pressure receiver is disposed between the outdoor heat exchanger and the expansion valve, and
a volume of the outdoor heat exchanger includes a volume of the pressure receiver.

10. The refrigeration apparatus according to claim 1, wherein $476.1 < \rho$.

11. The refrigeration apparatus according to claim 1, wherein the HFO refrigerant includes any of R1132(E), R1123, R1234yf, and R1234ze.

* * * * *

UNITED STATES PATENT AND TRADEMARK OFFICE
CERTIFICATE OF CORRECTION

PATENT NO. : 12,163,706 B2
APPLICATION NO. : 17/705777
DATED : December 10, 2024
INVENTOR(S) : Ikuhiro Iwata et al.

Page 1 of 1

It is certified that error appears in the above-identified patent and that said Letters Patent is hereby corrected as shown below:

In the Claims

At Column 19, Claim number 6, Line numbers 4-5:
"$130 \leq S \leq 1.3483E-03 \times \rho^{\wedge}2 - 2.1115E+00 \times \rho + 1.0996E+03$"
Should read:
-- $130/\alpha \leq S \leq (1.3483E-03 \times \rho^{\wedge}2 - 2.1115E+00 \times \rho + 1.0996E+03)/\alpha$ --.

Signed and Sealed this
Twenty-second Day of April, 2025

Coke Morgan Stewart
*Acting Director of the United States Patent and Trademark Office*